Figure 1:
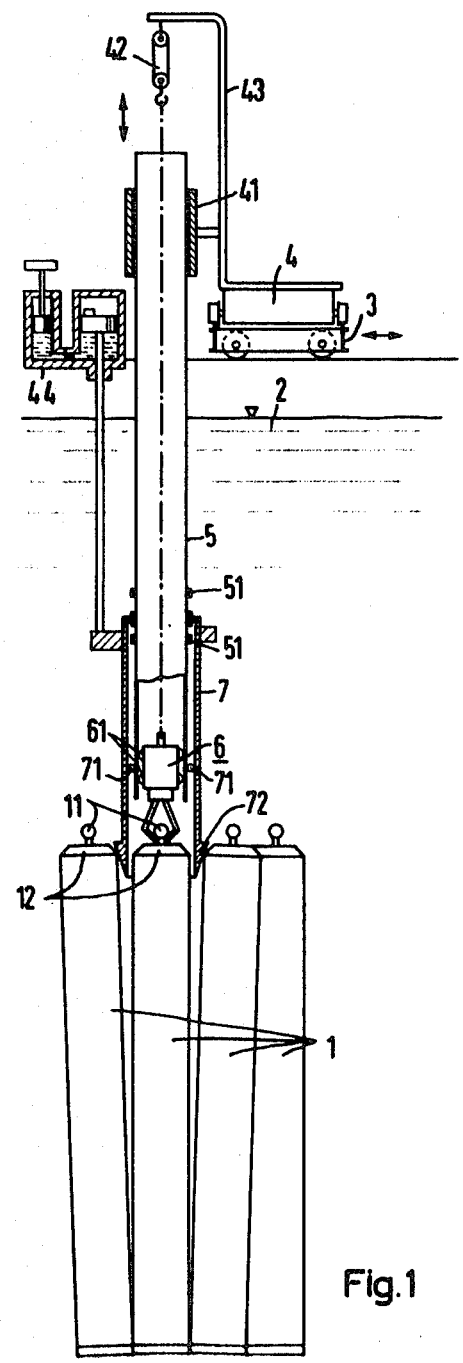

United States Patent

[11] 3,603,634

[72] Inventor Hermann Kumpf
 Dusseldorf-Eller, Germany
[21] Appl. No. 764,526
[22] Filed Oct. 2, 1968
[45] Patented Sept. 7, 1971
[73] Assignee Siemens Aktiengesellschaft
 Berlin and Munich, Germany

[54] CENTERING DEVICE FOR NUCLEAR REACTOR LOADING MACHINES
 7 Claims, 3 Drawing Figs.
[52] U.S. Cl. .................................................. 294/86,
 294/86.13
[51] Int. Cl. ...................................................... B66c 1/10
[50] Field of Search............................................ 294/86 A,
 86.13, 86.16, 131, 65.5; 214/8.5, 11, 15; 221/134

[56] References Cited
 UNITED STATES PATENTS
 2,924,483 2/1960 Koch et al..................... 294/86 A
 3,124,260 3/1964 Tidball.......................... 294/65.5
 3,126,008 3/1964 Geddes.......................... 214/11

Primary Examiner—Andres H. Nielsen
Attorneys—Curt M. Avery, Arthur E. Wilfond, Herbert L. Lerner and Daniel J. Tick ABSTRACT: Centering device in a machine for loading fuel elements in a nuclear reactor having a movable vertical tubular loading mast and a fuel element clamping device movable in the mast interior includes a tubular member located at and telescoping the lower end of the mast and being displaceable in the longitudinal direction thereof so as to telescope a fuel element selected from a multiplicity of fuel elements forming a reactor core. The tubular member has a lower edge portion formed with a surface engageable with the fuel elements of the reactor core located adjacent the selected fuel element so as to align the latter with the mast.

CENTERING DEVICE FOR NUCLEAR REACTOR LOADING MACHINES

My invention relates to a centering device for a fuel-element-loading machine employed for charging and discharging fuel elements in a pressurized or boiling water nuclear reactor.

The loading machine is of the known type which is secured to a travelling crane and adjustable in the vertical direction thereon, and is capable of travelling in two coordinate directions above a reactor core formed of a multiplicity of fuel elements and above a settling tank for the replaced radioactive fuel elements. This conventional type of loading machine comprises a tubular loading mast as well as a fuel element clamping device mounted for displacement in the interior of the tubular loading mast. To replace or exchange a fuel element in pressurized and boiling water reactors of conventional construction, an exceptionally accurate and delicately sensitive operating drive means for the fuel-element-replacing machine is required whereby the initial positioning of the respective fuel element is so accurate that the fuel element can be withdrawn from the position thereof without any mechanical obstruction or hindrance. It is difficult, however, to compensate for or balance out beforehand any inaccuracies that result, for example, from the length of the loading mast, because of which the fine adjustment of the loading device heretofore has had to be effected for the most part by manual correction performed by the servicing personnel. Due to these difficulties, especially great and painstaking attention has had to be given to fuel element replacement or exchange which has resulted accordingly in increasing the length of the time period necessary for carrying out the exchange.

It is accordingly an object of my invention to provide centering device for nuclear reactor loading machines which avoids the aforementioned disadvantages of the heretofore known loading machines by reducing the time necessary for carrying out the fuel element exchange and which, as a final objective, automates the entire operation.

It is a further object of my invention to provide such centering device as will facilitate the positioning of the respective fuel element without placing any excessive and taxing requirements on the skill and alertness or attention of the servicing personnel whose duties are limited only to observation and supervision of the loading operation.

With the foregoing and other objects in view, I have provided, in accordance with my invention, in a loading machine for pressurized and boiling water nuclear reactors having a substantially vertically disposed tubular loading mast and a fuel-element-clamping device movable in the interior of the tubular loading mast, wherein both the mast and the clamping device are movable into a position over a reactor core formed of a plurality of fuel elements, a centering device comprising a tubular member located at and telescoping the lower end of the tubular loading mast and being displaceable in the longitudinal direction thereof so as to be placed on a selected fuel element, the tubular member having a lower edge portion formed with a surface engageable with other fuel elements of the reactor core adjacent the selected fuel element so as to align the selected fuel element with the tubular loading mast. The surface engageable with the fuel elements, described by way of example as a preferred embodiment in this application, is conical.

Other features which are considered as characteristic for the invention are set forth in the appended claims.

Although the invention is illustrated and described herein as embodied in centering device for nuclear reactor loading machines, it is nevertheless not intended to be limited to the details shown, since various modifications and structural changes may be made therein without departing from the spirit of the invention and within the scope and range of equivalents of the claims.

Figure 3:
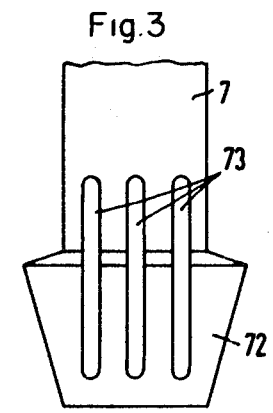
Figure 2:
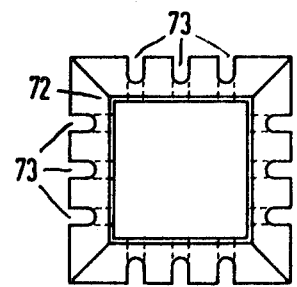

The construction and method of operation of the invention, however, together with additional objects and advantages thereof will be best understood from the following description of specific embodiments when read in connection with the accompanying drawing, in which:

FIG. 1 is a diagrammatic elevational view of the centering device of my invention as used in conjunction with a loading machine for exchanging fuel elements from a nuclear reactor; and FIGS. 2 and 3 are a plan view and a fragmentary elevational view, respectively, of the bottom end of a modified embodiment of the centering device shown in FIG. 1.

To avoid any unnecessary details which are immaterial with respect to the invention of the instant application, the reactor pressure vessel, the control devices and other conventional equipment of a pressurized or boiling water reactor have been omitted from the drawing. As shown in FIG. 1, the reactor core is represented by only four fuel elements 1 which are shown immersed in coolant having a surface level 2. As aforementioned, the reactor represented in FIG. 1 can be either of the boiling water or pressurized water types. A crane installation formed of a travelling crane bridge 3, which is displaceable in opposite horizontal directions exemplified by the associated double-headed arrow, and a trolley carriage 4, which travels back and forth in a direction perpendicular to the plane of the drawing of FIG. 1, is located above the reactor exemplified by the fuel elements 1 as well as above a nonillustrated settling tank of the reactor into which a fuel element, which is removed from the reactor core, is immersed and held therein for sufficient duration to permit the radioactivity thereof to be suitably dissipated. The carriage 4 has a boom 43 which carries a device 41 of conventional construction for holding and raising a hollow tubular loading mast 5 in vertical direction as shown by the associated double-headed arrow, and also carries at the free end thereof a hoisting unit 42 for a fuel-element-clamping device 6 which is located in the interior of the hollow loading mast 5 above a respective fuel element 1. By means of the crane installation, the loading mast 5 is able to be moved in two horizontal coordinate directions, namely in the directions of the crane bridge 3 as exemplified by the horizontally extending double-headed arrow as well as in the direction of the trolley carriage 4, i.e. in a direction perpendicular to the plane of the drawing of FIG. 1, so that it can thereafter be lowered telescopingly above each fuel element position. To achieve the required accuracy for controlling the positioning of the fuel elements, the loading mast 5 is provided with a centering device 7, in accordance with my invention, which has a tubular shape and which is so mounted telescopingly on the lower end of the loading mast 5 as seen in FIG. 1 as to be displaceable between a pair of stop rings 51 suitably mounted on the outside of the loading mast 5. The centering device 7 has an enlarged lower edge 72 as shown in FIG. 1 which, in the illustrated embodiment, has a conical shape and which, when telescopingly placed on a selected fuel element 1, is automatically centered with respect to the selected fuel element 1 which is surrounded thereby. The conical or tapering surfaces of the lower edge 72 of the centering device 7 are slidable for this purpose along the suitably shaped conical or inclined surfaces 12 of the fuel elements in a downward direction and thereby dispose the loading mast 5 so that it is located accurately above the selected fuel element 1 which is to be clamped by the clamping device 6 and removed from the reactor core. The fuel elements 1 which are located adjacent to the selected fuel element, which is to be removed from the reactor core, are simultaneously forced slightly in a lateral direction so that the fuel element to be exchanged is clamped at its gripping knob 11, located at an end thereof, by the aforementioned clamping device 6 which is carried by a sliding carriage displaceable along the interior of the loading mast 5 on roller bearings 61. The fuel element which is to be replaced is then drawn upwardly by the hoisting unit 42. Thus, locking or jamming of the fuel element, that is being replaced, with the fuel elements located adjacent thereto in the reactor core, is prevented from occurring.

Under certain conditions, it may be desirable to supervise with suitable observation devices the clamping of the gripping knob 11 of the fuel element 1 by the clamping device 6. For this purpose, therefore, in the modification shown in FIGS. 2 and 3, longitudinally extending slits 73 are provided on the periphery of the lower portion of the centering device 7 through which the personnel may observe the jaws of the clamping device 6 within the centering device 7. In the modified embodiment of FIGS. 2 and 3, there is shown by way of example a centering device having a substantially square cross section. It is, of course, quite obvious that the cross section of the centering device need not be square but can be of any other polygonal form, circular, elliptical or the like.

Generally, if the fuel elements 1 have a square cross section, i.e. they are of the type known, for example, as box-shaped fuel elements, the centering device generally having the square-shaped cross section such as shown in FIGS. 2 and 3 can be used in conjunction with the loading device for replacing these fuel elements. Such fuel elements conventionally are provided with a sheet metal cladding which can be formed with a plurality of nonillustrated bores solely for permitting penetration thereof by the surrounding coolant. However, fuel elements have also become available which do not have this so-called box about them and which are not provided with any outer sheet metal cladding of this type. Such fuel elements are held together only by suitable construction of spacer members within the reactor core or by special structural elements as is well known in the art. Especially in the latter case, it is essential that the fuel elements located adjacent to the fuel element being exchanged are forced slightly away in lateral directions when removing or inserting a fuel element, to an extent determined by the play or clearance provided in the construction thereof, so that mutual jamming or binding of these fuel elements with the fuel element being exchanged is thereby safely avoided. To assist in the spreading action, wherein the adjacent fuel elements are shifted slightly laterally of the fuel element being replaced, it can be desirable, however, to force the centering device 7 by means of a conventional pressure-exerting device 44, for example of hydraulic type, deeper between the fuel element being removed or replaced and the adjacent fuel elements of the reactor core in order to provide thereby even greater space therebetween to permit removal of the respective fuel element telescopingly surrounded by the centering device 7, without the entrainment of any of the adjacent fuel elements and raising of the same therewith. When the loading mast 5 is raised by the lifting device 41, which can have a construction, for example, similar to the lifting mechanism of a mechanical jack, the centering device 7 which then rests at its upper end as shown in FIG. 1 against the lower stop ring 51 is simultaneously raised therewith and removed from the reactor core. Friction between the loading mast 5 and the centering device 7 is preferably reduced by means of rollers 71 to the smallest possible value.

It should be again noted that, depending upon the shape of the fuel element 1 which is to be replaced, the lower edge of the centering device 7, as viewed in FIG. 1, can be given any suitable desired cross-sectional shape. Under certain conditions, it is also feasible and desirable to provide either or both of the respective adjacent surfaces of the centering device 7 and the loading mast 5 with projecting ribs for reducing the friction therebetween, these ribs consisting, for example, of a material having good sliding characteristics, i.e. a low coefficient of friction. It is also possible, for example, by means of having an inclined guide for the lower limiting edge to thereby effect better sliding thereof on the fuel element which is to be clamped by the clamping device 6. Also, in such a case it is desirable to appropriately shape the head of the respective fuel element 1 accordingly.

I claim:

1. In a loading machine for pressure and boiling water nuclear reactors having a substantially vertically disposed tubular loading mast and a fuel element clamping device movable in the interior of the tubular loading mast, both the mast and the clamping device being movable into a position over a reactor core formed of a plurality of fuel elements, a centering device comprising a tubular member located at and telescoping the lower end of the tubular loading mast and being displaceable together therewith in the longitudinal direction thereof, so as to be placed on a selected fuel element, said tubular member having an enlarged lower edge portion formed with a downwardly inclined surface engageable with fuel elements adjacent the selected fuel element so as to force the adjacent fuel elements aside and align the selected fuel element with the tubular loading mast.

2. Centering device according to claim 1, wherein the surface of the lower edge portion of said tubular member has a conical shape.

3. Centering device according to claim 1, wherein said lower edge portion of said tubular member has a thickness greater than the spacing between the fuel elements of the reactor core, said tubular member being displaceable by force of gravity downwardly about a selected fuel element to be removed from the reactor core so as to be disposed in the space between the selected fuel element and the adjacent fuel elements surrounding it, whereby the adjacent fuel elements are laterally displaced so as to facilitate removal of the selected fuel element.

4. Centering device according to claim 1, wherein said lower edge portion of said tubular member has a thickness greater than the spacing between the fuel elements of the reactor core, and including means for forcibly displacing said tubular member downwardly about a selected fuel element to be removed from the reactor core so as to be disposed in the space between the selected fuel element and the adjacent fuel elements surrounding it, whereby the adjacent fuel elements are laterally displaced so as to facilitate removal of the selected fuel element.

5. Centering device according to claim 4, wherein said displacing means is a hydraulic pressure device operatively connected to said tubular member.

6. Centering device according to claim 1, including at least one slit formed in said lower edge portion of said tubular member for observing the selected fuel element received therein.

7. Centering device according to claim 6, including a plurality of slits uniformly spaced about the peripheral surface of said lower edge portion.